United States Patent [19]

Nicholson

[11] E Patent Number: Re. 31,639

[45] Reissued Date of Patent: Jul. 31, 1984

[54] BIDIRECTIONAL UNICABLE SWITCHING SYSTEM

[76] Inventor: Victor Nicholson, 4701 Willard Ave., #1033, Chevy Chase, Md. 20015

[21] Appl. No.: 321,999

[22] Filed: Nov. 16, 1981

Related U.S. Patent Documents

Reissue of:

[64] Patent No.: 4,077,006
Issued: Feb. 28, 1978
Appl. No.: 672,066
Filed: Mar. 30, 1976

U.S. Applications:

[63] Continuation of Ser. No. 116,192, Jan. 28, 1980, abandoned, which is a continuation-in-part of Ser. No. 558,425, Mar. 14, 1975, abandoned, which is a continuation of Ser. No. 405,846, Oct. 12, 1973, abandoned.

[51] Int. Cl.[3] ..... H04B 1/06; H04N 1/00

[52] U.S. Cl. ..... 455/4; 455/5; 455/6; 358/86

[58] Field of Search ..... 455/3–6, 455/57; 358/86

[56] References Cited

U.S. PATENT DOCUMENTS

| | | | |
|---|---|---|---|
| 2,064,896 | 12/1936 | Espenschied et al. | 455/57 |
| 3,639,840 | 2/1972 | Shekel et al. | 455/6 |
| 3,665,311 | 5/1972 | Gargini | 455/5 |
| 3,668,307 | 6/1972 | Face et al. | 455/5 |
| 3,801,735 | 4/1974 | Gabriel | 455/4 |
| 3,806,814 | 4/1974 | Forbes | 455/5 |

OTHER PUBLICATIONS

IEEE Spectrum Appl. Report on "Two Way Applications for Cable Television Systems in the '70s," by Jurgen, 11/71 (pp. 39–54).

*Primary Examiner*—Jin F. Ng
*Attorney, Agent, or Firm*—James Creighton Wray

[57] ABSTRACT

A two-way cable television broadcasting system wherein a single coaxial cable is used to deliver TV and FM programs to many subscribers with each subscriber having a specific allocated band of frequencies for reception of any desired television or FM program and where each subscriber can independently select the program desired to be seen and/or heard which will be delivered to the subscriber over an allocated band of frequencies. The subscriber drops from said coaxial cable are so arranged that they descend in frequency along the length of the feeder cable. Automatic switching of any incoming program to any drop is achieved by means of converting all incoming channels to a common I.F. frequency at an amplifier or control station and then deconverting said frequency to the desired outgoing band of frequencies.

16 Claims, 6 Drawing Figures

BIDIRECTIONAL UNICABLE SWITCHING SYSTEM

Matter enclosed in heavy brackets [ ] appears in the original patent but forms no part of this reissue specification; matter printed in italics indicates the additions made by reissue.

This [application] *reissue is a continuation of Ser. No. 116,192, filed Jan. 28, 1980, now abandoned, which is reissue of U.S. Pat. No. 4,077,066, issued Feb. 28, 1978, based on application 672,066, filed Mar. 30, 1976, which* is a continuation-in-part of Ser. No. 558,425, filed Mar. 14, 1975, now abandoned; which is a continuation of Ser. No. 405,846, filed Oct. 12, 1973, now abandoned.

*SUMMARY OF THE INVENTION*

This invention relates to a two-way coaxial sending and receiving system wherein a single coaxial cable is used to send and receive television signals with each subscriber drop being assigned its own specific allocated band of frequencies.

It is well known in the art that cable television systems today have the capabilities of delivering up to 35 different television channels of programming plus the full spectrum of FM services to all subscribers. Existing systems are "party line" type systems whereby the same programming is delivered to all subscribers. These cable systems also have the capability of returning television signals to the headend.

There have been other types of systems proposed in the past whereby each subscriber has separate downstream and upstream cables thereby permitting him to remotely select any available program. The subscriber could dial the desired program and at a local switching center, the subscriber's cable would be interconnected to that channel. This type of switching system presents the possibility of a subscriber being able to request television programs from libraries of video tapes providing educational programs, foreign language lessons, cultural or sporting events. This system had one inherent weakness: the requirement for a separate feeder cable to every subscriber. This requires the use, in either aerial or underground construction, of large bundles of cables. This type of system—in spite of its promise—has not succeeded in this country, because of excessive costs.

*OBJECTS OF THE INVENTION*

It is the general object of this invention to provide the above noted services by using a system wherein a single coaxial cable is used to deliver television programs to many subscribers, where each subscriber has a specifically allocated television channel or band of frequencies for reception of desired programs, where each subscriber independently selects the program to be sent on the subscriber's assigned channel, where all subscribers can receive FM signals, and where a descending order of television frequencies is delivered to subscribers on the feeder cable. The same feeder coaxial cable that is used for reception of the signal is used to transmit back to the amplifier or control station a signal from the subscriber to select the desired program.

A still further general object of this invention is the use of this same feeder coaxial cable to send back to the control station a television signal on the assigned channel. This program can be used for two-way television of broadcast quality between any two subscribers or for a conference of subscribers.

This invention is similar in concept to the prior art "Wired Broadcasting Systems" shown by Eric J. [Gargine] *Gargini*, U.S. Pat. No. 3,665,331 and Ralph Porton Gabriel, U.S. Pat. No. 3,801,735. A major difference in this system from the above systems is that rather than providing two separate feeder cables to each subscriber (one downstream, the other upstream), up to 35 subscribers can utilize the same feeder cable for receiving signals downstream and sending them upstream. Each subscriber on a given feeder coaxial cable is allocated a separate channel for reception and transmission of programs plus the transmission of control signals. These channels are allocated to individual subscribers on the basis of distance along the feeder from the control station with the closer subscribers being assigned a higher frequency spectrum.

The primary advantage of this system along with the other switching type wired broadcasting systems is that each subscriber has the capability of remotely selecting one of possibly hundreds of available television or other programs at any time. The immediate applications using existing single trunk cable systems is primarily one-way, downstream where the subscribers choice is limited to 35 television channels and full spectrum of FM as this is the total delivered to each control station and therefore the total available for connection to the subscribers who requested them. Later there can be additional origination of programming at the control station (which could be located in a public school or library). To further increase the subscriber's program choices the cable operator can duplicate the trunk part of the system. Other possible applications, where the trunk part of the system is two-way, are for the subscriber's return signals to be sent to other parts of the system upon being received at the control station.

It is still a further object of this invention to apply it to multi or single dwellings. Since both the downstream and upstream services use the same bandwidth for each subscriber and since this bandwidth is wide enough to a television channel, it is possible for one or any number of subscribers to simultaneously originate television programming. This programming can be automatically routed back to the control station onto an upstream trunk line to the headend, and then downstream to another preselected subscriber.

It is a still further object of the instant invention that it is distinguished from present CATV systems in the following manner:

CATV systems generally have up to two line extender amplifiers cascaded in the feeders from each output of the bridger amplifier; the proposed system eliminates these line extenders. The limiting factor for distance of subscriber service from a feeder, in a CATV system, is the [attention] *attenuation* of the coaxial cable at the top frequency for which the system is designed. The instant invention extends feeders more than twice as far without amplification as its limiting factor is the attenuation of the coaxial cable at channel 2. This feature provides reduced system cost and elimination of system distortions as introduced in the line extenders. The feeder is a coaxial cable whose size (and therefore attenuation) is determined by the distance to the furthest subscriber. Several feeder cables can be paralleled for areas of high density of homes.

The above mentioned and other features and objects of this invention and the manner of attaining them will become more apparent and the invention itself will best be understood by reference to the following description of embodiments of the invention taken in conjunction with the accompanying drawing the description of which follows:

Figure 1:
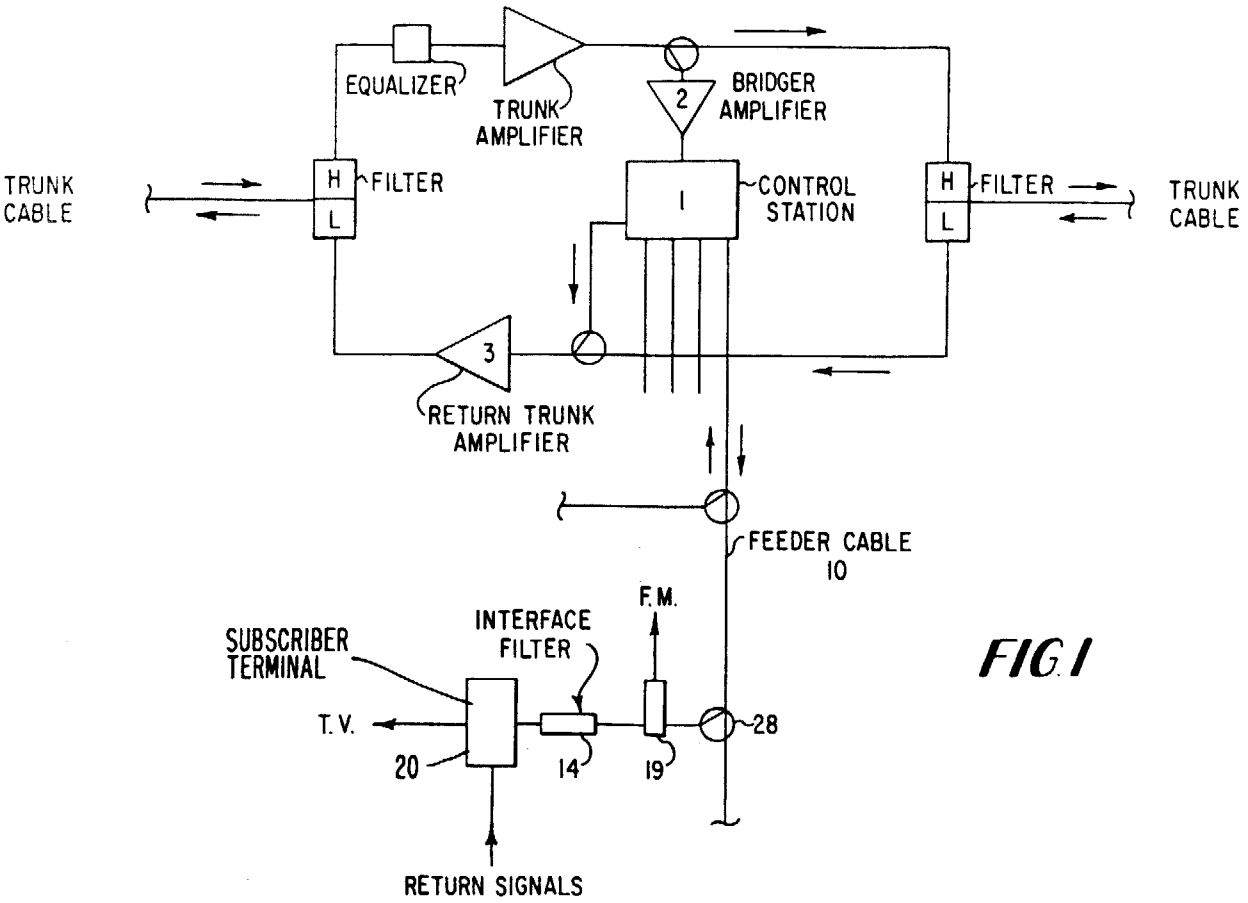
FIG. 1 is a diagrammatic representation of the Trunk, Bridger and Control Station and feeder cable of the instant invention which is similar to a conventional CATV system such as that shown in "Two-way Applications for Cable Television Systems in the 70's." (Ronald K. Jurgen, Spectrum of IEEE, November 1971, FIG. 4, page 45.) A significant difference however is the elimination of line extender and the modifications to the Trunk and Bridger Station to include a Control Station.

In present CATV systems, at some trunk locations, some of the broadband TV and FM signal is split off with a directional coupler, amplified in a bridger amplifier and distributed down feeder lines which pass the various subscriber locations. For those wishing to subscribe, a tap is made into the feeder cable and to a cable drop to the subscriber's residence, which drop is connected to the subscriber's TV set. All channels are on the cable and are received by all subscribers.

This system incorporates separating into individual channels the combined signals at the control Station, converting them to common I.F. frequencies and switching each one to the desired outgoing R.F. channel and feeder cable to satisfy the request of a subscriber. The switching circuitry can be of any type capable of being controlled by a remote voltage. Therefore, by the application of a frequency selective voltage, any subscriber can have any channel connected to his/her feeder cable.

As by way of example the frequency allocation to each feeder can be as follows:

SUBSCRIBER FREQUENCY ALLOCATIONS

| Subscriber No. | MHz |
|---|---|
| 1 | 294-300 |
| 2 | 288-294 |
| 3 | 282-288 |
| 4 | 276-282 |
| 5 | 270-276 |
| 6 | 264-270 |
| 7 | 258-264 |
| 8 | 252-258 |
| 9 | 246-252 |
| 10 | 240-246 |
| 11 | 234-240 |
| 12 | 228-234 |

-continued

SUBSCRIBER FREQUENCY ALLOCATIONS

| Subscriber No. | MHz |
|---|---|
| 13 | 222-228 |
| 14 | 216-222 |
| 15 | 210-216 |
| 16 | 204-210 |
| 17 | 198-204 |
| 18 | 192-198 |
| 19 | 186-192 |
| 20 | 180-186 |
| 21 | 174-180 |
| 22 | 168-174 |
| 23 | 162-168 |
| 24 | 156-162 |
| 25 | 150-156 |
| 26 | 144-150 |
| 27 | 138-144 |
| 28 | 132-138 |
| 29 | 126-132 |
| 30 | 120-126 |
| 31 | 82-88 |
| 32 | 76-82 |
| 33 | 70-76 |
| 34 | 64-70 |
| 35 | 58-64 |

Note:
88-108 MHz is used for F.M. signals to all subscribers.
108-120 MHz is not used as it includes aircraft navigation band - even though there should be no radiation problem.

*DETAILED DESCRIPTION OF THE DRAWINGS*

In the following detailed description and the drawing, like reference characters indicate like parts.

In FIG. 1 is shown a Trunk and Bridger Amplifier and Control Station where the Control Station 1 receives signals from the bridger amplifier 2 and sends them to the subscribers. It also receives signals from subscribers and sends them upstream to the cable system headend by way of the Return Trunk Amplifier 3.

Figure 2:
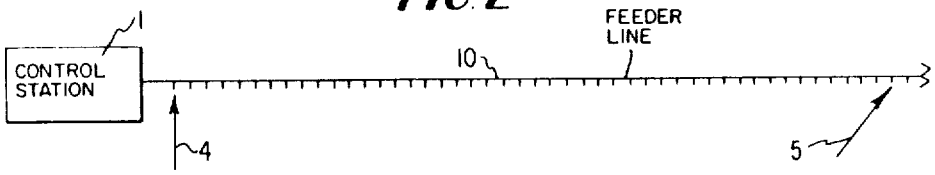
FIG. 2 is a diagrammatic representation of a typical feeder cable showing the Control Station terminal and the coaxial cable disclosing subscriber drops along its effective length.

In FIG. 2 is shown a Control Station 1 and a feeder cable 10, descending from said Control Station. The closest subscriber 4 is allocated the TV channel spectrum of 294-300 MHz plus the FM spectrum 88-108 MHz and the most distant subscriber 5 is allocated the TV channel spectrum 54-60 MHz plus the FM spectrum of 88-108 MHz. The other subscribers on the feeder cable are assigned TV channel spectrums in a descending order plus the FM spectrum 88-108 MHz.

Figure 3:
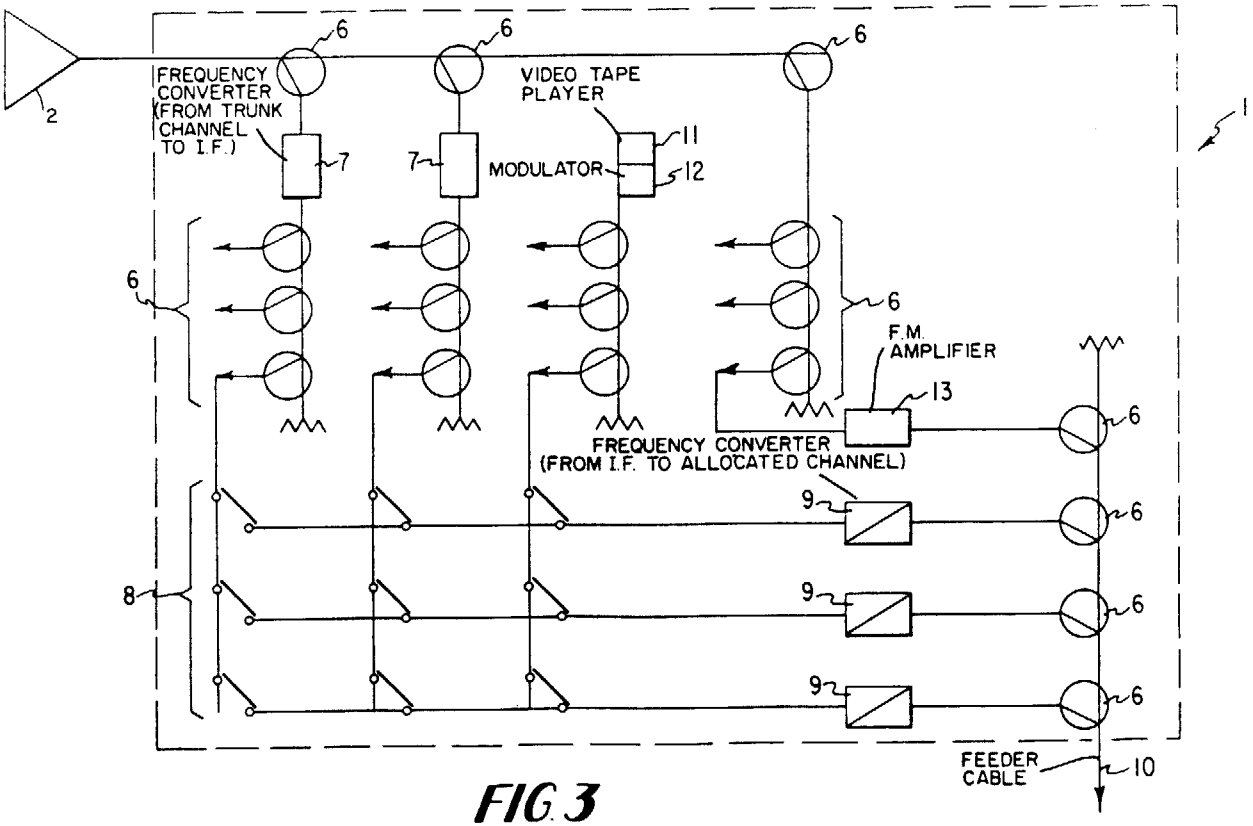
FIG. 3 is a diagrammatic representation from the Control Station showing the downstream paths of the television signals to the individual subscribers.

In FIG. 3 is shown the downstream functions of the Control Station 1, to one of the feeder cables, which receives the multichannel output of the bridger amplifier 2 through directional couplers 6 and processes each TV channel separately, through the down converters 7 that provides a common I.F. band of frequencies 41 to 47 MHz. The outputs of these converters are connected with further directional couplers 6 to the input terminals of switching network 8. The output of the switching network connects the requested channel's I.F. to TV channel up-converter 9. This switching can be mechanical, electronic or any automatic type where a desired program can be sent to the proper channel converter through additional directional couplers 6 to feeder cable 10. Local TV program origination whether live or by tape is handled the same way. This is shown by videotape player 11 connected to modulator 12 for conversion of video to I.F. and is available to be switched to any subscriber. By this system the Control Station connects any desired I.F. modulation to any output channel on any feeder.

The FM signals are handled differently in that the broadband spectrum 88–108 MHz is maintained throughout; further directional couplers 6 connect the bridger amplifier's output to FM amplifier 13 and the various feeder coaxial cables 10. By this system the Control Station connects FM to all feeder cables.

Figure 4:
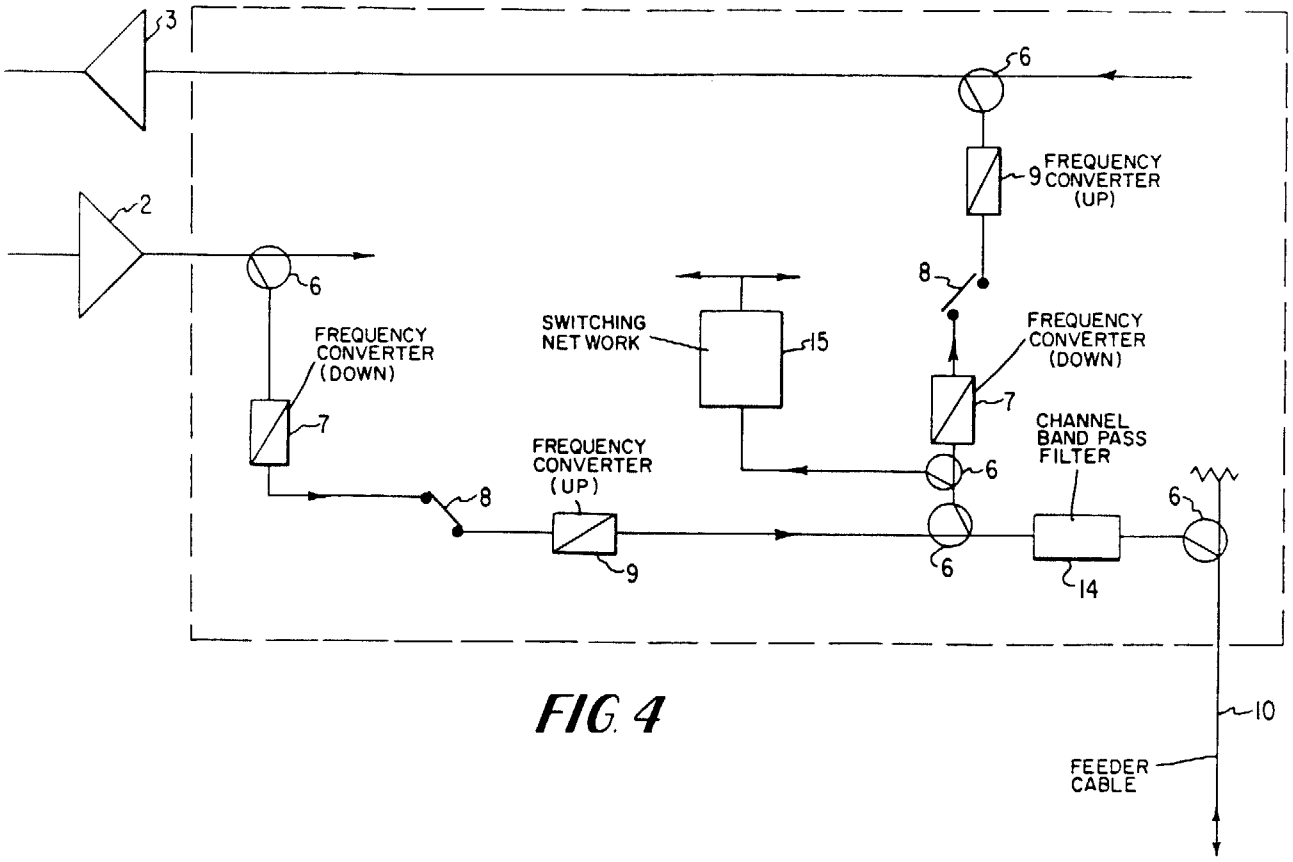
FIG. 4 is a diagrammatic representation of the Control Station showing the downstream, upstream and control signal paths.

In FIG. 4 is shown the downstream, upstream and control functions of the Control Station 1. The downstream functions are the same as shown in FIG. 3 with signals from bridger amplifier 2 being connected via directional coupler 6, being converted to I.F. by down-converter 7, being switched by 8 to the desired channel up-converter 9 and connected to the feeder cable 10 through a channel bandpass filter 14.

The upstream television signals from feeder cable 10 are fed through directional coupler 6, through the channel bandpass filter 14, through other directional couplers to an I.F. down-converter 7, then through the automatic switch network 8 to the desired channel up-converter 9 and through a directional coupler to the return trunk amplifier 3, in the Trunk and Bridger Amplifier and Control Station. These functions enable the TV or data return channels to be ultimately fed to the Cable System headend, there to be redistributed to any other subscriber.

The upstream control signals are fed to the frequency selective voltage control network 15 where they provide frequency selective voltages to control the automatic switching of both upstream and downstream signals. For a detailed description of this network see FIG. 5.

Figure 5:
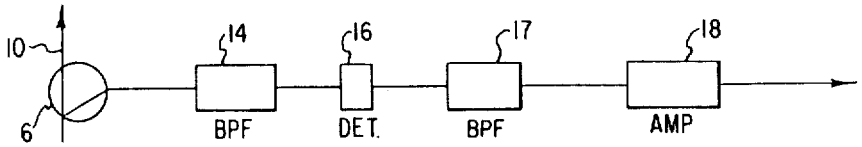
FIG. 5 is a diagrammatic representation of a section of the Control Station that processes the subscriber's control signal.

In FIG. 5 is shown various functions that are employed in controlling the switching network that allocates the television channels being sent and received by a subscriber. This is done by a network that receives and responds to a control signal from a subscriber. A subscriber can send this signal by modulating with a discrete frequency the lower R.F. band edge of the subscriber's allocated channel. All taps, cable, filters and accessories on the feeder cable 10 are two-way so this control signal is split off the feeder at the Control Station by a directional coupler 6, connected to channel R.F. bandpass filter 14, to an R.F. detector 16, then a low frequency bandpass filter 17 that accepts the desired frequency selective signal and feeds it to amplifiers and that develops a control voltage for the automatic switching. Items 16, 17 and 18 are components of the frequency selective control network 15 in FIG. 4. Items 6, directional couplers, which are in the control path after 14 are not shown on this FIG. 6.

The conversion of any incoming television channel at the Control Stations to an outgoing television channel is accomplished by converting all incoming channels to a common I.F. frequency, switching them by means of control signals and then reconverting them to the desired outgoing frequency.

The switching, which is not shown, can be typical of any of those that are employed in two-way cable television systems such as that shown at the program exchange in U.S. Pat. No. 3,801,705 of Gabriel, referred to above, for non-duplication or other services. It can be electronic, mechanical or any automatic type wherein the control signal from any subscriber will actuate the switching circuit and cause the desired program to be sent to the subscriber.

Figure 6:
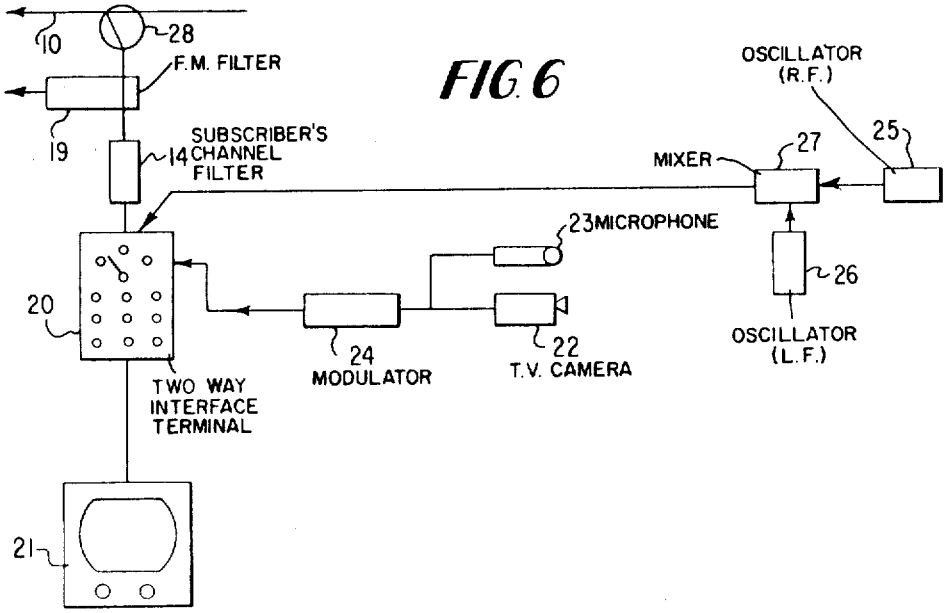
FIG. 6 is a diagrammatic representation of a two-way subscriber drop from the feeder cable to the receiver and back.

In FIG. 6 is shown a two-way subscriber drop which includes the two-way feeder cable 10, directional coupler 28 and an FM bandpass filter 19 to pass FM to the subscriber irrespective of TV channel allocation. The feedthru section of the FM filter connects all TV signals to a TV channel bandpass filter 14, to the subscriber's two-way interface terminal 20 and to the TV receiver 21.

The upstream TV transmitting circuit can comprise of a TV camera 22, microphone 23 and modulator 24. An upstream control signal transmitting circuit could include a lower band edge R.F. oscillator 25, a discrete low frequency oscillator 26 and a mixer or modulator 27. This control signal can be switched on by the subscriber's interface terminal 20.

While the principles of the invention have been described in connection with specific apparatus, it is to be clearly understood that this description is made only by way of example and not as a limitation to the scope of the invention.

I claim:

1. In a cable distribution system having a head end, means at said [heat] *head* end for receiving multiple television channels, a coaxial cable having multiple channel capacity connected to said head end, a bridger amplifier connected to the coaxial cable for receiving and amplifying signals in the multiple television channels, a control station connected to the bridger amplifier, said control station including a switching network and channel converters connected to the bridger amplifier, a feeder cable having a plurality of subscriber allocated channels, said feeder cable connected to the switching network and channel converters, a plurality of subscriber drops connected to the feeder cable, each subscriber drop being connected to a single subscriber allocated channel in the feeder cable, thereby allocating one channel in the feeder cable to each subscriber drop, means at each subscriber drop for sending a control signal to the control station on the subscriber allocated channel allocated to that subscriber drop to control the switching network at the control station.

2. In a system set forth in claim 1, wherein means are located at the subscriber drop for sending a television signal to the control station on the same subscriber allocated television channel allocated to the subscriber drop and means at said control station for sending the television signal to other subscribers.

3. In a system as set forth in claim 1, wherein the allocated channel frequencies are allocated to subscriber drops in a descending order depending on the distance of such subscriber drop from the control station.

4. In a system as set forth in claim 1 wherein means for sending the control signal from a subscriber drop to the control station comprises means for sending the control signal on the lower end of the subscriber drops' allocated [frequency] *frequencies.*

5. The cable distribution system of claim 1 wherein the control station switching network and channel converters comprise a first plurality of channel converters connected to bridger amplifier for converting multiple channels from the coaxial cable to a common I.F. band of frequencies, a switching network connected to the first converters, and a second plurality of converters connected to the switching network and to the feeder cable for converting the common I.F. band of frequencies to the separate subscriber allocated channel.

*6. In a system as set forth in claim 1, wherein the switching network switches programs to any or all subscribers on request.*

*7. In a cable distribution system having a head end, means at said head end for receiving multiple channels, a coaxial cable having multiple channel capacity connected to said head end, a bridger amplifier connected to the coaxial cable for receiving and amplifying signals in the multiple channels, a control station connected to the bridger amplifier, said control station including a switching network and channel converters connected to the bridger amplifier, a feeder cable having a plurality of subscriber allocated channels, said feeder cable connected to the switching network and channel converters, a plurality of subscriber drops connected to the feeder cable, each subscriber drop being connected to a single subscriber allocated channel in the feeder cable, thereby allocating one channel in the feeder cable to each subscriber drop, means at each subscriber drop for sending a control signal to the control station on the subscriber allocated channel allocated to that subscriber drop to control the switching network at the control station.*

*8. In a system set forth in claim 7, wherein the allocated channel frequencies are allocated to subscriber drops in a descending order depending on the distance of such subscriber drop from the control station.*

*9. In a system as set forth in claim 7, wherein the switching network controls programs from multiple channel sources such a libraries and schools which are sent to each subscriber on his allocated channel for reception of desired programs.*

*10. The cable distribution system of claim 7, wherein the control station switching network and channel converters comprise a first plurality of channel converters connected to a bridger amplifier for converting multiple channels from the coaxial cable to a common I.F. band of frequencies, a switching network connected to the first converters, and a second plurality of converters connected to the switching network and to the feeder cable for converting the common I.F. band of frequencies to the separate subscriber allocated channel.*

*11. In a system set forth in claim 7, wherein means are located at the subscriber drop for sending a signal to the control station on the same subscriber allocated channel allocated to the subscriber drop and means at said control station for sending the signal to other subscribers.*

*12. A cable distribution system having a head end, means at said head end for receiving multiple bands of frequencies, a coaxial cable having capacity for multiple bands of frequencies connected to said head end, a bridger amplifier connected to the coaxial cable for receiving and amplifying signals in the multiple bands of frequencies, a control station connected to the bridger amplifier, said control station including a switching network and frequency converters connected to the bridger amplifier, a feeder cable having a plurality of subscriber allocated bands of frequencies, said feeder cable connected to the switching network and frequency converters, a plurality of subscriber drops connected to the feeder cable, each subscriber drop being connected to a single subscriber allocated band of frequencies in the feeder cable, thereby allocating one band of frequencies in the feeder cable to each subscriber drop, means at each subscriber drop for sending a control signal to the control station on the subscriber allocated band of frequencies allocated to that subscriber drop to control the switching network at the control station.*

*13. A system set forth in claim 12 wherein means are located at the subscriber drop for sending a signal to the control station on the same subscriber allocated band of frequencies allocated to the subscriber drop and means at said control station for sending the signal to other subscribers.*

*14. A system as set forth in claim 12, wherein the allocated bands of frequencies are allocated to subscriber drops in a descending order depending on the distance of such subscriber drop from the control station.*

*15. A system as set forth in claim 12, wherein means for sending the control signal from a subscriber drop to the control station comprises means for sending the control signal on the lower end of the subscriber drops' allocated band of frequencies.*

*16. A system as set forth in claim 12, wherein the control station switching network and frequency converters comprise a first plurality of frequency converters connected to bridger amplifier for converting multiple bands of frequencies from the coaxial cable to a common I.F. band of frequencies, a switching network connected to the first converters, and a second plurality of converters connected to the switching network and to the feeder cable for converting the common I.F. band of frequencies to the separate subscriber allocated band of frequencies.*

* * * * *